United States Patent
Hopkins, Jr.

[15] 3,679,978
[45] July 25, 1972

[54] INDUCED POLARIZATION SYSTEM AND METHOD FOR GEOLOGICAL INVESTIGATION HAVING A STABLE WAVEFORM

[72] Inventor: George H. Hopkins, Jr., P.O. Box 5546, Austin, Tex. 78703

[22] Filed: Jan. 19, 1970

[21] Appl. No.: 3,642

[52] U.S. Cl. ............................ 325/187, 325/28, 325/29, 325/133, 325/134, 325/159, 321/7, 321/61, 321/69 R, 324/5, 324/7, 324/9
[51] Int. Cl. ...................................................... H04b 1/04
[58] Field of Search .................... 325/28, 29, 133, 134, 159, 325/185, 186, 187; 321/7, 60, 61, 65, 66, 69 R; 324/5, 7, 9

[56] References Cited
UNITED STATES PATENTS

| | | |
|---|---|---|
| 3,170,107 | 2/1965 | Jessee ........................... 321/61 |
| 3,419,785 | 12/1968 | La Fuze ......................... 321/61 |
| 3,431,483 | 3/1969 | La Fuze .......................... 321/7 |

Primary Examiner—Richard Murray
Assistant Examiner—Albert J. Mayer
Attorney—Edmund F. Bard and Donald H. Fidler

[57] ABSTRACT

An induced polarization transmitter circuit is provided with a polyphase cycloconverter for rendering the transmitter output signal independent of both the load on the transmitter circuit and the AC power supply which energizes the transmitter circuit. Novel analog and digital feedback circuitry is provided for monitoring and controlling the amplitude and waveform of the transmitter output signal.

23 Claims, 5 Drawing Figures

PATENTED JUL 25 1972 3,679,978
SHEET 1 OF 4

George H. Hopkins, Jr
INVENTOR

BY Arnold, Roylance
Kruger & Durkee
ATTORNEYS

INDUCED POLARIZATION SYSTEM AND METHOD FOR GEOLOGICAL INVESTIGATION HAVING A STABLE WAVEFORM

BACKGROUND OF INVENTION

This invention relates to methods and apparatus for mineral exploration, and more particularly relates to induced polarization methods and apparatus for locating ore bodies and the like.

It is well known to investigate the oil bearing possibilities of subsurface earth formations traversed by a borehole, by measuring the resistivity of the earth between selected points along the length of the borehole. More particularly, a current flow is established between two spaced-apart electrodes which are drawn along the borehole wall, and a continuous measurement is made of the magnitude of the current flow to derive a resistivity profile in correlation with borehole depth.

This same basic technique is commonly utilized for the purpose of prospecting for ore bodies, except that in such an instance the spaced-apart electrodes are embedded in the surface of the earth at various selected locations, and an electrical field is established in the surrounding earth by generating a current flow between two of the electrodes. There is a fundamental difference between the utilization and interpretation of measurements which are made for the purpose of finding ore bodies, however. Oil and gas well logging operations are conducted principally for the purpose of measuring the lithological characteristics of the formations traversed by a borehole to determine their fluid-bearing possibilities, whereas surface prospecting measurements are aimed primarily at locating the ore bodies themselves instead of being directed to an analysis of the lithology of the earth in which the ore bodies are found.

More particularly, the magnitude of the electrical field established in the earth by a current flow between two electrodes is merely a function of the apparent resistivity of the portion of the earth which contains the two electrodes, and this "apparent" resistivity is actually a summation of two different factors which will be hereinafter referred to as the true or "intrinsic" resistivity and certain electrochemical reactions which are caused by the current flow. The amount of earth materials such as the various aluminates and silicates, and the like, is the principal factor in determining the portion of the measurement which is attributable to the intrinsic resistivity of the earth, whereas it is the amount or proportion of material such as iron and copper ore and the like, which undergoes a chemical change when subjected to a current flow, and which determines the portion of the measurement attributable to the other factor.

Accordingly, a prospecting technique which is commonly referred to as the "induced polarization" technique has been devised for the purpose of distinguishing and emphasizing the portion of the apparent resistivity measurement which is due to the aforementioned electrochemical changes. More particularly, the induced polarization technique is intended to provide separate indications of the intrinsic resistivity and the electrochemical reactions in the earth in the vicinity of the two embedded electrodes, whereby both factors may be separately measured and analyzed to provide a better indication of the presence of certain preselected minerals.

Induced polarization techniques fall into two classes which are commonly referred to as "time domain" and "frequency domain" techniques. In the case of a time domain measurement (also known as the pulse method), current is applied to a pair of spaced-apart "transmitter" electrodes which are embedded in the ground sought to be investigated. After this current has been applied to the earth during a preselected discrete time interval, the overvoltage or polarization which has occurred due to these electrochemical reactions, and which tends to decay relatively slowly after termination of this "on" interval, may be measured during the following "off" interval which precedes the next succeeding "on" interval. The magnitude of the voltage remaining after the expiration of a preselected "off" time interval, which commences with the termination of the preceding "on" interval, is actually measured for comparison with the voltage established in the earth during this preceding "on" interval.

In the case of frequency domain measurements, it is conventional to compare the measurement of the apparent impedance of the earth during the application of a higher "AC"-frequency to the two transmitter probes with a corresponding measurement of the apparent impedance of the earth during the application of a lower "DC" reference frequency to the two probes. The polarization effect of these two frequencies is then evaluated in terms of the percentage of increase in conductance which occurs during the application of the AC frequency, as compared to that which is produced during the application of the DC frequency. The amount of this percentage of increase is usually referred to as the "frequency effect". Another measurement which is sometimes made, is to determine the magnitude of phase shift which will occur, and to treat this measurement as a function of the frequency of the transmitter signal in the determination of the amount of polarization effect which has been produced in the earth.

Although many different systems have been developed for the purpose of making frequency domain measurements, the object of all such systems is basically to establish an electrical field in a region of the earth by generating a current flow between two spaced-apart transmitter probes embedded therein, and to measure the signal induced in one or more other electrodes by this electrical field to determine the apparent impedance of that region of the earth. If a useful indication of the magnitude and configuration of the ore body is to be obtained, however, the current flow applied to the earth must be provided with a preselected wave form having a preselected amplitude. The electrical field established or created by this current may be detected and measured, in a conventional application of the induced polarization technique, by means of a pair of spaced-apart receiver probes which are spaced, in turn, from the transmitter probes. The so-called "receiver current" provides an indication of not only the voltage induced between the two receiver probes by the current flow between the two transmitter probes, but also of the effects had on the wave form of the current flowing between the two transmitter electrodes.

The magnitude of the voltage differential between the receiver probes is a function of the resistivity of the earth in the vicinity of the transmitter and receiver probes, and the size of the region of earth encompassed by the electrical field depends on the spacing between the two transmitter probes (among other factors). Accordingly, the voltage measurement which is provided by the receiver equipment connected to the two receiver probes, may be analyzed to provide an indication of the size and configuration (shape and depth) of any ore body which may occupy the earth between these corresponding pairs of transmitter and receiver probes.

In many of the conventional induced polarization systems used for detecting ore bodies, the transmitter is adapted to generate current in either of two alternative wave forms; i.e., in the form of a conventional "square wave", or in the form of a so-called "dead time" square wave output, wherein there is a dead time interval (during which the transmitter output current is reduced to reference or "zero") between each output pulse of current. In either form, current pulses of alternating polarity are generated at a predetermined frequency and each for a predetermined time interval. In the dead time form, however, it should be noted that the duration or width of the pulse need not be the same as that of the so-called dead time interval between two consecutive pulses.

In the case of either wave form, it is the change in measured apparent resistivity which is sought to be detected as a function of frequency, and which provides the indication of the presence of an ore body or the like. There are many causes for such a change, however, and it is only the changes which result from the presence of an ore body which are sought to be detected and analyzed. Accordingly, a voltage measurement is usually taken at two or more different frequencies to provide variations in the "apparent" resistivity which are a function of frequency, and it is these variations which are usually analyzed as hereinbefore explained to provide an indication of the character of the medium between corresponding transmitter and receiver probes.

The basic concept of the induced polarization technique is that frequency information may be derived from transient measurements, and vice-versa, because time and frequency domain data are related to each other through the Fourier transform when the phenomenon is linear in character. In practice, however, the field measurements provided by the systems of the prior art are much too crude to allow such transformations to be made, and thus it has hitherto been impossible to utilize induced polarization data to uniquely determine one parameter in terms of another. Accordingly, the prior art systems are generally employed only to provide the basic resistivity measurements hereinbefore explained.

There are many factors which have contributed to the fact that the prior art systems have not been employed in a more sophisticated manner. However, one of the most important reasons is that the transmitters of the prior art have not provided an output signal which may be controlled and maintained with sufficiently precise limits so as to give the signal sufficient validity for such a purpose.

In the transmitters which have been most commonly employed until the present, an AC output signal (usually 400 cps) is first rectified by reversing the polarity of the negative waves or pulses to provide a rectified output signal composed entirely of positive pulses at a preselected frequency (i.e. 800 cps). Thereafter this rectified signal is applied to a bridge circuit which commutates to periodically reverse the polarity of a preselected portion or number of these positive pulses to provide the conventional square wave output signal hereinbefore mentioned. Alternatively, if the so-called "dead-time" wave form is sought to be provided, the signal is "killed" for a preselected time interval during the latter portion of each commutation cycle.

One of the principal disadvantages of prior art transmitter circuits is the aforementioned bridge circuit, since it is necessary to turn off or otherwise inactivate certain components in the circuit each time the signal is commutated, and in order to effectively turn off a transmitter circuit of conventional design, it is necessary to reduce its current output to zero — and to hold it at zero for a preselected interval of time — irrespective of the type of wave form which is sought to be provided. This is inherently difficult to accomplish, and requires extensive additional circuitry which, in turn, makes commutation of the transmitter dependent on the impedance of the load (probes, cables and the earth between the probes).

Another significant disadvantage of the systems of the prior art arises from fluctuations in the operation of the power supply which energized the transmitter. Thus, the character of the transmitter output signal is often affected to a considerable degree by fluctuations in both the frequency and the amplitude of the generator output.

Still another disadvantage of the prior art systems arises from the inability of the monitoring and control circuits now in use to properly and adequately regulate the transmitter output signal. In particular, these prior art circuits are incapable of sensing and correcting an error with sufficient speed and precision to maintain the transmitter output current within the limits necessary to perform the kind of investigations which are theoretically possible.

It should be clearly understood that the reason why more precise and informative induced polarization surveys have hitherto been unattainable is only partially due to the inadequacies of the transmitter circuits and techniques of the prior art, and receiver circuit instability and imprecision is also a contributing factor. Nevertheless, increased receiver sensitivity and stability is of little value if the electrical field is irregular and undependable due to inadequacies in the transmitter systems and techniques. Furthermore, any receiver output signal will necessarily be better for the elimination or substantial reduction of fluctuations and irregularities in the transmitter signal which establishes the electrical field generated in the earth.

These and other disadvantages of the prior art are overcome with the present invention, and novel means and methods are provided to generate a transmitter output signal having greater precision and stability, and thus having much greater validity for ore detection and other like purposes.

SUMMARY OF INVENTION

In a particularly suitable embodiment of the present invention, an induced polarization system is provided which has generally the same overall configuration as the systems of the prior art, but which incorporates certain distinctive features including a novel transmitter for generating an output current which is controlled within more precise limits. More particularly, the output signal from the power supply associated with the transmitter is passed through a polyphase cycloconverter, whereby the transmitter output signal is given a unique wave form and amplitude.

A cycloconverter is, in effect, a static type of frequency-to-frequency conversion means. More particularly, however, it may be described as a circuit which receives an AC power signal and which derives from such power signal an output frequency which is different in some respect from the frequency of the AC power signal. In the present invention, a polyphase cycloconverter is preferably included which derives an output or "transmitter" signal which not only has a frequency which is different from the frequency of the input AC power signal, but which also has a wave form and amplitude which are independent of both the load on the cycloconverter and the AC power supply which drives it.

In a particularly suitable design, the power signal is first applied to a primary silicon controlled rectifier circuit which selects predetermined portions of each lobe of the power signal in order to establish the ultimate voltage of the transmitter output signal. These lobe portions which are selected may then be applied to a transformer to step up the voltage of the signal a suitable extent (such as from 120/208 volts to 360/624 volts). Thereafter, the amplified lobe portions may be applied to a secondary silicon controlled rectifier circuit which selectively applies lobes of each polarity to the cables leading to the two transmitter probes.

It will be noted that there will be no commutation problem in a transmitter circuit constructed as hereinbefore described, since the AC voltage in such a circuit is applied directly to the aforementioned silicon controlled rectifier circuits. This automatically turns off the silicon controlled rectifier circuits by merely reversing their voltages, whereupon the additional stabilization circuitry needed in the prior art transmitters is unnecessary in the case of the present invention. Thus, elimination of the commutation problem of the prior art equipment, together with the use of certain other novel control circuitry, renders the power circuits of the transmitter independent of the impedance of the load on the transmitter output circuit.

The purpose of such a transmitter is to provide an output current which may be controlled within more precise limits than is the case with the transmitters in the prior art systems, and which is also substantially independent of both the load (the earth, probes and cables) and the power supply. Other advantages and features of this improvement include greater efficiency of operation and the provision of an output current which may be controlled over a much wider range of amplitudes without concurrently creating an undue volt/ampere demand on the power supply. Finally, and possibly most important, the instant transmitter is capable of selectively producing an output current having any of a variety of various preselected wave forms without the sacrifice of any of the foregoing advantages.

Basically, therefore, it is an object of the present invention to provide induced polarization transmission and reception methods and apparatus of sufficient precision and sensitivity to provide accurate indications of the magnitude and configuration of an ore body of commercial significance, as well as providing a mere indication of the presence of such a body. More particularly, however, it is an object of the present invention to provide methods and apparatus for generating a transmitter output signal having an amplitude and waveform which may be established and maintained within extremely precise preselected limits.

Inasmuch as the output signal from the transmitter is a function of the load (the probes, cables, and the earth between the probes) on the transmitter circuit, however, it is a further object of the present invention to provide methods and apparatus for generating a transmitter signal which is also independent of the load on the transmitter circuit.

In an optimum form of the present invention, an induced polarization transmitter circuit is provided which employs a polyphase cycloconverter for rendering the power circuit substantially independent of the load on the transmitter, and which thereby permits the waveform of the transmitter output signal to be synthesized within extremely precise limits. Novel analog and digital feedback circuitry is also provided to function in combination with the cycloconverter for monitoring and controlling the voltage and waveform of the transmitter output signal.

These and other features and advantages of the present invention will be apparent from the following detailed description of an exemplary form of method and apparatus, wherein references will be made to the figures in the accompanying drawings.

IN THE DRAWINGS

FIG. 1 is a functional representation of an induced polarization system including transmitter and receiver equipment arranged in a conventional manner for the purpose of investigating a section of the earth for ore bodies or the like.

DETAILED DESCRIPTION

Figure 1:
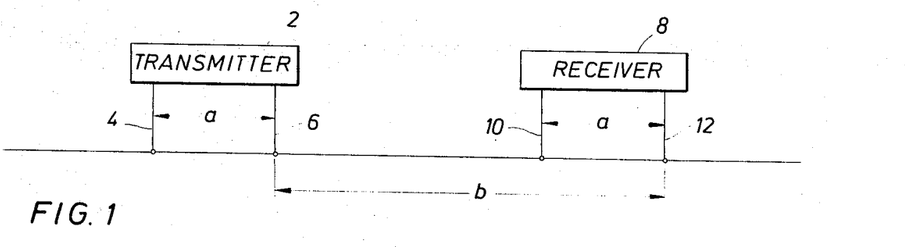

Referring now to FIG. 1, there may be seen a functional diagram of the basic arrangement of a typical dipole-dipole induced polarization system. More particularly, the system may be seen to include a transmitter circuit 2 which is connected by cables (not depicted) to a pair of electrodes 4 and 6 of any conventional design and which are embedded in the earth, and spaced a preselected distance apart for establishing an electrical field in the earth. The receiver equipment 8 is connected by suitable cables (not depicted) to a pair of similarly spaced-apart electrodes 10 and 12 of conventional design which are also embedded into the earth but at two different locations. As may be seen in FIG. 1, the transmitter electrodes 4 and 6 correspond to the receiver electrodes 10 and 12, whereby the significant spacing between electrodes 4 and 10 is the same as the spacing between electrodes 6 and 12, and whereby this is the spacing which determines the region to be investigated.

Referring again to FIG. 1, the earth may be considered to be a conducting medium for the purposes of the present invention. More particularly, the transmitter 2 is caused to apply an electrical current to the earth by way of the electrodes 4 and 6 for the purpose of creating an electromagnetic field which is functionally related in magnitude to the apparent resistivity of the portion of the earth between corresponding pairs (4 and 10, or 6 and 12) of the electrodes. This field may be measured, of course, by an analysis of the voltage which develops between the two receiver electrodes 10 and 12, and this voltage is the sum of the effects of both the intrinsic resistivity distribution of the portion of the earth sought to be investigated, and of the impedance attributed to the electrochemical reactions which occur therein.

In most instances there will be no ore bodies present which are of commercial significance. Accordingly, the predominant factor in most measurements of the apparent resistivity of the earth will be the intrinsic or true resistivity of the earth materials lying within the region of the earth which is determined by the spacing and arrangement of the electrodes or probes 4, 6, 10 and 12. Thus, the voltage will be substantially constant in most measurements even though the transmitter 2 is caused to generate an output signal at two different frequencies.

However, the electrochemical reactions which result from the presence of an ore body are a function of the frequency of the signal which produces such reactions. Thus, if there is an ore body present in the earth between corresponding transmitter and receiver electrodes, the amplitude of the signal measured between the receiver electrodes 10 and 12 at one transmitter output frequency will be measurably different from that which is measured when the transmitter output signal is of a different frequency.

The areal extent and the depth of the electromagnetic field in the earth depends, of course, upon the spacing between corresponding pairs of transmitter and receiver electrodes, as well as upon the spacing between the two transmitter electrodes 4 and 6. Accordingly, if one is interested in a measurement of properties of the earth at a greater depth, the transmitter electrodes 4 and 6 may be moved farther apart from the receiver electrodes 10 and 12. On the other hand, the spacing between the corresponding pairs of transmitter and receiver electrodes may be kept constant, and the transmitter electrodes 4 and 6 and receiver electrodes 10 and 12 may be moved to different locations for the purpose of determining the extent of the ore body.

Unfortunately, the foregoing technique may be practiced only under extremely optimum conditions which occur only infrequently. As hereinbefore stated, this is principally due to the fact that the transmitter methods and circuits of the prior art are incapable of generating an output signal having sufficient validity for such a task, since it requires that the transmitter 2 generate a signal to the probes or electrodes 4 and 6 which has an extremely precise amplitude and waveform notwithstanding the conditions under which the system must be operated. In other words, fluctuations in amplitude and waveform which are due to an unstable output signal from the transmitter 2, cannot usually be distinguished in the receiver 8 from those variations which are produced by the earth and which are sought to be observed and analyzed.

Figure 2:
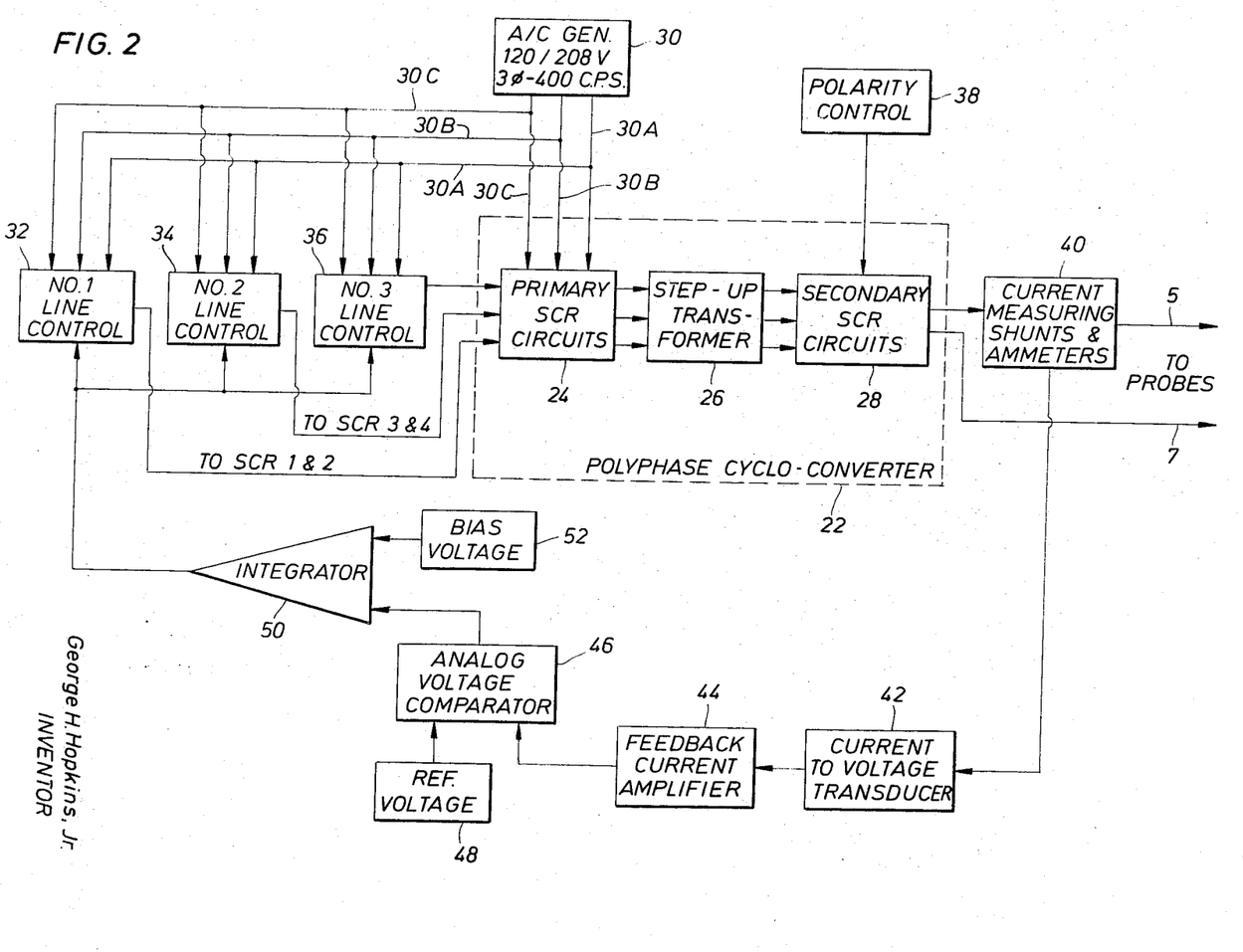
FIG. 2 is a simplified functional representation of one form of transmitter equipment embodying the concept of the present invention and suitable for use in a system of the type depicted in FIG. 1.

Referring now to FIG. 2, there may be seen a functional representation of the major components of a circuit suitable for use in producing the transmitter signal for an induced polarization system, and embodying the concept of the present invention. Accordingly, there may be provided a polyphase cycloconverter 22 for the purpose of synthesizing an output signal which is independent of load. The cycloconverter 22 may be composed of a first group of silicon controlled rectifier circuits which are hereinafter referred to as the primary SCR circuit 24, s step-up transformer 26, and a second group of silicon controlled rectifier circuits hereinafter referred to as the secondary SCR circuit 28. A power supply 30, which may be an AC generator providing a three-phase, 400 cycle per second output signal of 120/208 volts, is connected by conductors 30A–C to the primary SCR circuit 24 and to each of three separate line control circuits 32–36.

As will hereinafter be explained in detail, the primary SCR circuit 24 is preferably composed of a group of six SCR stages which are hereinafter referred to as the No. 1–6 SCR stages. Accordingly, the No. 1 line control circuit 32 is adapted and arranged to deliver suitable firing signals to the No. 1 and 2 stages of the primary SCR circuit, the No. 2 line control circuit 34 delivers firing signals to the No. 3 and 4 stages therein, and the No. 3 line control delivers firing signals to the No. 5 and 6 stages.

The secondary SCR circuit 28 is adapted to generate a transmitter output signal which may be applied to the pair of spaced-apart transmitter probes or electrodes 4 and 6 by way of cables 5 and 7 which may be of any suitable conventional design. However, the polarity of this output signal is preferably determined by a suitable polarity control circuit 38, and a conventional assembly of current measuring shunts and ammeters 30 may be interconnected with one of the two cables 5 and 7 for the purpose of providing a visual indication of the magnitude of the signal being generated by the transmitter probes 4 and 6.

As indicated in FIG. 2, the system of the present invention may include a feedback circuit to maintain the transmitter output signal at a preselected value, and also to render this signal independent of fluctuations in either the amplitude or the frequency of the output of the generator 30, or both, and also independent of variations in load impedance. In particular, the assembly of shunts and ammeters 40 may be adapted to provide a signal equal to or functionally related to the current input to the probes 4 and 6, and this signal, in turn, may be applied to the input side of a suitable current-to-voltage transducer 42 (such as a Hall effect device) for the purpose of developing a voltage which is functionally related to the current applied to the probes 4 and 6.

The output voltage from the current-to-voltage transducer 42 is preferably applied to the input side of a conventional feedback current amplifier 44 which generates a functionally related output voltage for application to one of the two inputs of an analog voltage comparator 46. The purpose of the reference voltage source 48 is to provide an output signal having a waveform which is functionally related at all instances of time to the time dependent instantaneous amplitude characteristics of the transmitter output signal 5 which is sought to be maintained. The other input of the analog voltage comparator 46 may be connected to the suitable reference voltage supply 48 so as to provide an output voltage which is representative of the algebraic sign of the difference between the outputs of the reference voltage supply 48 and the amplifier 44. As depicted in FIG. 2, the output signal from the analog voltage comparator 46 may be applied to one of two inputs of a suitable integrator 50 having its other input connected to the output of a suitable source of bias voltage 52. The output signal from the integrator 50 is, in turn, applied to the inputs of the three line control circuits 32–36, as will hereinafter be explained.

As previously stated, it is the purpose of the three line control circuits 32–36 to regulate the transmitter signal being applied to the probes 4 and 6 as a function of the output voltage being generated by the integrator 50. More particularly, however, the various firing or reference voltages which are provided by the line control circuits 32–36 may be selected or established so as to make the output signal to the probes 4 and 6 a direct linear function of the output voltage from the integrator 50, and this linearity will prevail over the greater portion of the range of output voltages which may be generated by the circuitry depicted in FIG. 2. This is an important feature of the present invention, since the transmitter circuitry depicted in FIG. 2 is thus more easily controlled by the feedback section which comprises the transducer 42, feedback current amplifier 44, and analog voltage comparator 46.

Figure 3:
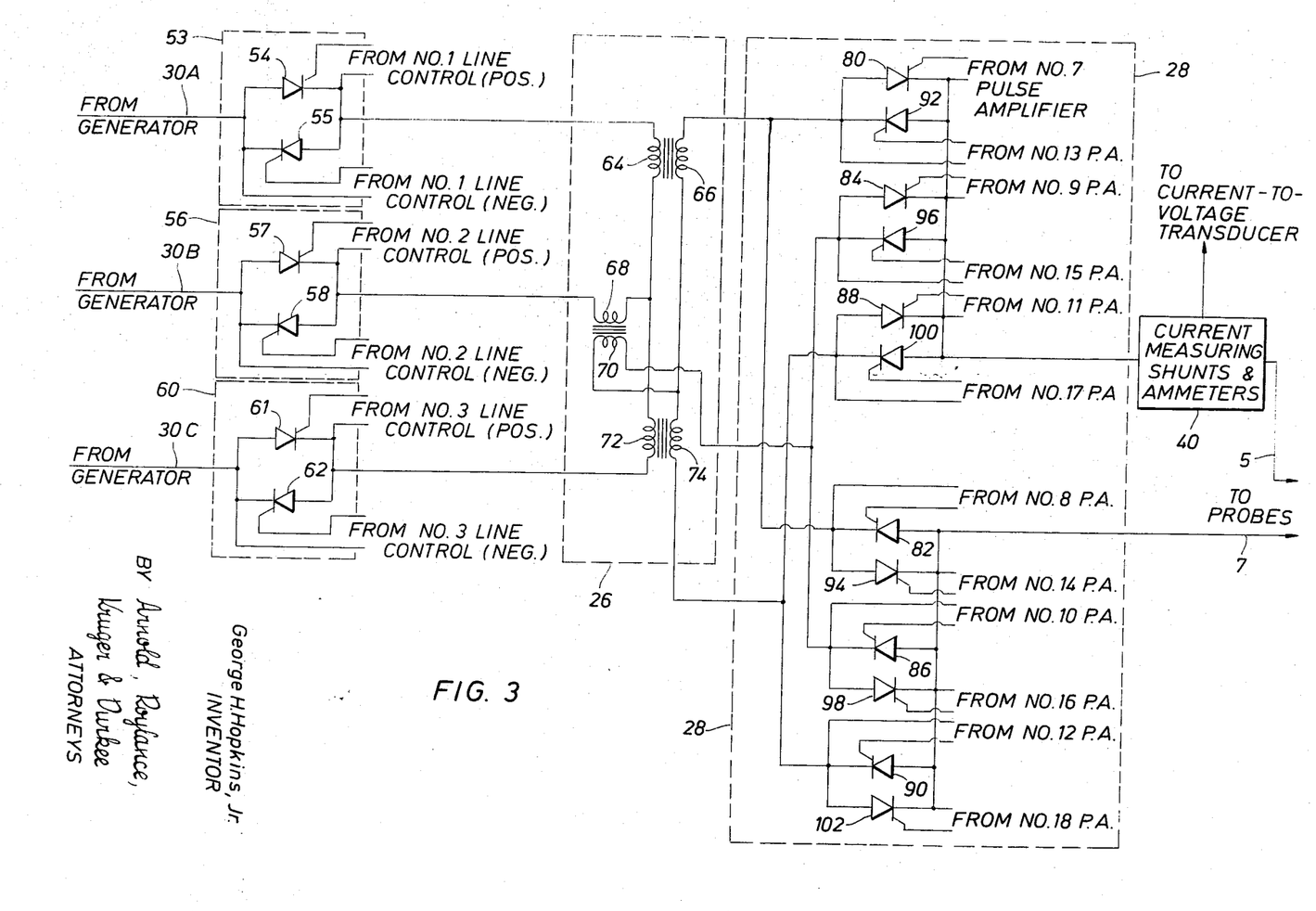
FIG. 3 is a more detailed schematic representation of a portion of the apparatus depicted more generally in FIG. 2.

Referring now to FIG. 3, there may be seen a more detailed schematic representation of one form of the polyphase cycloconverter 22 depicted in FIG. 2, and further depicting the primary SCR circuit 24 as composed of three pairs of SCR stages 53, 56 and 60, a suitable 3:1 step-up transformer 26, and the secondary SCR circuit 28 hereinbefore mentioned. More particularly, the SCR stage 53 may be seen to be composed of a No. 1 SCR 54 having its anode connected to the generator 30 by way of conductor 30A, and having its cathode and gate connected to receive a positive firing signal from the No. 1 line control circuit 32. More particularly, the timing of the firing signal from the No. 1 line control circuit 32 is preferably of a character such that when the input line voltage in conductor 30A is positive in character, the No. 1 SCR 54 will be rendered conductive. Similarly, the No. 2 SCR 55 may be seen to have its anode connected to the cathode of the No. 1 SCR 54, and its cathode and gate terminals to receive firing signals provided by the No. 1 line control circuit 32. The No. 2 SCR 55 is also connected to the input line voltage provided by conductor 30A. Accordingly, the No. 2 SCR 55 is connected to receive a different firing signal from the No. 1 line control 32 such that the No. 2 SCR 55 will be rendered conductive when the line voltage in conductor 30A is negative in character.

The second SCR stage may be similarly connected to conductor 30B and the No. 2 line control circuit 34. Accordingly, the No. 3 SCR 57 is connected such that it will be rendered conductive in response to a positive input from the generator 30 by way of conductor 30B when it receives a suitable firing control signal from the No. 2 line control circuit 34. Similarly, the No. 4 SCR 58 will conduct when the input voltage from the generator 30 in conductor 30B is negative, and when it also receives a suitable firing voltage from the No. 2 line control 34. The third SCR stage 60, which includes the No. 5 SCR 61 and the No. 6 SCR 62, is connected to be actuated by suitable firing signals from the No. 3 line control circuit 36, and to conduct when the input voltage in line 30C is positive and negative respectively.

Referring again to FIG. 3 and more particularly to the No. 1–3 SCR stages 53, 56 and 60, it will be apparent that the No. 1 SCR 54 will conduct only when the No. 2 SCR 55 is non-conductive, and also when one of either the No. 4 SCR 58 or the No. 6 SCR 62 is conducting, depending upon which of the two conductors 30B and 30C between the generator 30 and the No. 2 and 3 SCR stages 56 and 60 happens to be negative relative to the other. This is determined, of course, by logic circuitry in the line control circuits 32–36.

Similarly, the No. 2 SCR 55 in the first SCR stage 53 will conduct only when the No. 1 SCR 54 is non-conductive, and only when one of either the No. 3 SCR 57 or the No. 5 SCR 61 is conducting. Whether the No. 3 SCR 57 or the No. 5 SCR 61 may be conducting depends, of course, upon whether the conductor 30B between the generator 30 and the second SCR stage 56 is positive or negative with respect to the conductor 30C between the generator 30 and the third SCR stage 60. It may therefore be seen that when the No. 1 SCR 54 in the first SCR stage 53 is conducting, power will pass from the generator 30 through primary windings 64 and 68 during the first half of its cycle, and through the primary windings 64 and 72 through the second half of its cycle. Alternatively, when the No. 2 SCR 55 is conducting, the No. 3 SCR 57 will conduct during the first half of the cycle of its input voltage, and the No. 5 SCR 61 will conduct during the other half of its input voltage cycle.

As may be seen in FIG. 3, voltages generated in the primary winding 64 may be stepped-up at a 3-to-1 or other suitable predetermined ration in the secondary winding 66. Similarly, voltages in the primary winding 68 are stepped-up in the secondary winding 70, and voltages in the primary winding 72 are stepped-up in the secondary winding 74. Windings 64–74 together with suitable core material, of course, constitute the transformer 26 referred to in FIG. 2.

Referring again to FIG. 3, it may be seen that the secondary SCR circuit 28 is composed of two full-wave polyphase bridge rectifier circuits connected in inverse parallel with respect to each other. More particularly, one of these rectifier circuits may be seen to be composed of the No. 7 SCR 80, the No. 8 SCR 82, the No. 9 SCR 84, the No. 10 SCR 86, the No. 11 SCR 88, and the No. 12 SCR 90. The other rectifier circuit may similarly be seen to be composed of the No. 13 SCR 92, the No. 14 SCR 94, the No. 15 SCR 96, the No. 16 SCR 98, the No. 17 SCR 100, and the No. 18 SCR 102. When current is conducted through any one of the No. 7–12 SCRs 80–90, this will cause the probe or electrode 4 and cable 5 connected to the No. 17 SCR 100 to be positive as contrasted to the electrode 6 and cable 7 connected to the No. 8 SCR 82. Alternatively, when one of the Nos. 13–18 SCRs 92–102 are conducting, this will render the electrode 6 which is connected to the No. 8 SCR 82 to be positive with respect to the probe 4 which is connected to the No. 17 SCR 100. Only two of the No. 1–6 SCR units 54–55, and 57–58, and 61–62, in the secondary SCR circuit 28 will be conducting at any particular time, and whether a particular SCR unit is conducting depends upon the character of the firing signals which are delivered to each of these SCR stages by appropriate pulse amplifiers in the polarity control circuit 38. More particularly, the No. 7 SCR 80 is connected to respond to the No. 7 pulse amplifier in the polarity control circuit 38, the No. 8 SCR 82 is connected to respond to a suitable firing signal from the No. 8 pulse amplifier, the No. 9 SCR 84 responds to a suitable firing signal from the No. 9 pulse amplifier, the No. 10 SCR 86 responds to a suitable firing signal from the No. 10 pulse amplifier, and so forth.

It will be seen that the amplitude of the voltage being applied to the probes 4 and 6 from the No. 8 SCR 82 and the No. 17 SCR 100, is controlled by the phase angles at which conduction is initiated in the three SCR stages 53, 56 and 60 of the primary SCR circuit 24. Accordingly, the line control circuits 32–36 are preferably adjustable, as will hereinafter be apparent, in order that the transmitter voltages being applied to the probes 4 and 6 may be established within extremely precise limits.

Figure 4:
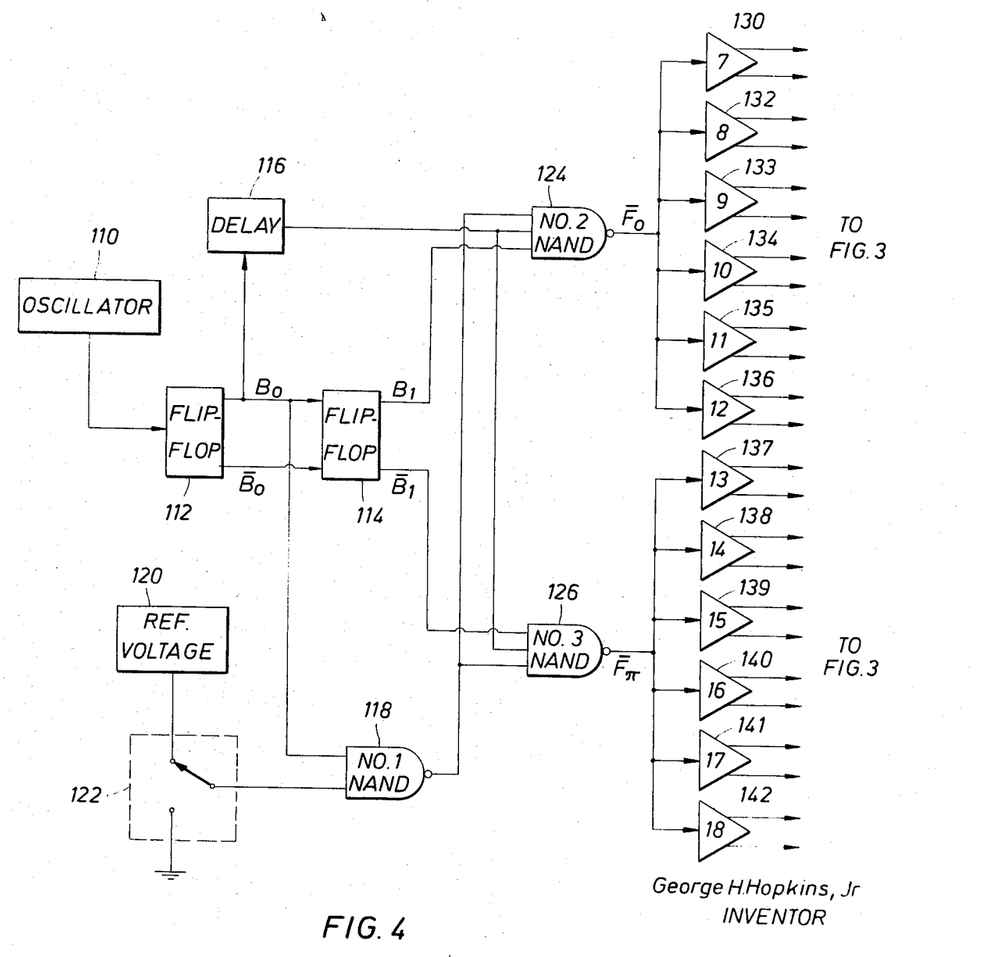
FIG. 4 is a more detailed schematic representation of another portion of the apparatus depicted in FIG. 2.

Referring now to FIG. 4, there may be seen a schematic representation of the major components of a suitable form of the polarity control circuit 38 depicted more generally in FIG. 2. More particularly, the polarity control circuit 38 may be seen to include a suitable oscillator 110 having its output signal coupled to the input side of a conventional bistable multivibrator 112 of the type referred to in "Pulse and Digital Circuits" (1956), by Jacob Millman and Herbert Taub, as a flip flop. The output terminals of this first multivibrator 112 may be seen to be connected to the inputs of a second bistable multivibrator 114. It will also be seen that one of the outputs of the first bistable multivibrator 112 is also connected to the input of a suitable delay circuit 116 and to one of the two inputs of a first or No. 1 NAND gate circuit 118. The other input circuit of the No. 1 NAND gate 118 is connected to a suitable source of reference voltage 120 by way of a single-pole, double-throw mode switch 122.

The purpose of the mode switch 122 is to determine whether the transmitter circuitry 2 depicted in FIGS. 1 and 2 shall provide a time domain or a frequency domain output signal. More particularly, when the mode switch 122 is moved to its alternate position to connect the No. 1 NAND gate 118 to ground voltage, this will condition the circuitry depicted in FIG. 2 to provide a frequency domain signal. Alternatively, when the mode switch 122 is positioned as depicted in FIG. 4 to connect the reference voltage source 122 to the No. NAND gate 118, the circuitry depicted in FIG. 2 will provide a time domain output as will hereinafter be explained in detail.

Referring again to FIG. 4, it may be seen that the second bistable multivibrator circuit 114 has one of its two outputs connected to one of three inputs of a second or No. 2 NAND gate 124, and the other of its two output terminals connected to one of the input terminals of a third or No. 3 NAND gate 126. The output of the No. 1 NAND gate 118 is connected to another of the three inputs of the No. 2 NAND gate 124, and also to another of the three inputs of the No. 3 NAND gate 126. The delay circuit 116, in turn, is connected to the third input of each of the No. 2 and No. 3 NAND gates 124 and 126.

The oscillator 110 is preferably adapted to generate a train of actuating pulses of a preselected frequency and duration. Each of these pulses from the oscillator 110 will trigger the first bistable multivibrator circuit 112. Accordingly, half of these input pulses will cause the bistable multivibrator 112 to generate an output signal $B_o$ in the output circuit connected to the delay circuit 116, and No. 1 NAND gate 118, and one of the inputs of the second bistable multivibrator circuit 114. The other half of the input pulses from the oscillator 110 will reverse the bistable multivibrator circuit 112, thereby discontinuing its output signal $\bar{B}_o$ from the delay circuit 116, the No. 1 NAND gate 118, and the second bistable multivibrator circuit 114, and apply a different signal $\bar{B}_o$ to the other input of the second bistable multivibrator 112.

The delay circuit 116 may conveniently be a conventional monostable multivibrator circuit such as the type referred to as a flip flop in the aforementioned book by Millman and Taub. Accordingly, upon a given output pulse from the oscillator 110, the first bistable multivibrator circuit 112 will be conditioned to generate a first output signal $\bar{B}_o$ to the input of the multivibrator 114, to remove the output signal $B_o$ from the input of the delay circuit 116, and to generate one of the inputs of the second bistable multivibrator circuit 114, and from one of the two inputs of the No. 1 NAND gate 118, as hereinbefore stated. This causes the output of the delay circuit 116 to go from one to zero (binary) for a preselected time interval, and it also causes the second bistable multivibrator circuit 114 to provide an output signal $B_1$ to the No. 2 NAND gate 124. The momentary change in the output of the delay circuit 116 acts to effectively inhibit the operation of the No. 2 NAND gate 124 for a time duration within which the output pulse or signal from the delay circuit 116 is at binary zero. Upon reversion of the delay circuit 116 to its initial or "normal" state, however, this inhibiting signal will disappear, and the No. 2 NAND gate 124 will generate a suitable output signal $F_o$ to the No. 7–12 power amplifiers 130–136 which are connected to the appropriately numbered SCR components 80–90 in the secondary SCR circuit 28.

If the mode switch 122 is positioned so as to connect the reference voltage 120 to the No. 1 NAND gate 118, this will cause the No. 1 NAND gate 118 to generate a suitable enabling signal to the input of the No. 2 NAND gate 124 to actuate the No. 7–12 power amplifiers 130–136, as hereinbefore explained. If the mode switch 122 is positioned to connect the appropriate input of the No. 1 NAND gate 118 to ground, however, the output of the No. 1 NAND gate 118 will always be one (binary) irrespective of the condition of the first multivibrator circuit 112.

The No. 3 NAND gate 126 will only provide a suitable output signal to the No. 13–18 power amplifiers 137–142 when in receipt of a suitable output signal $\bar{B}_1$ from the second bistable multivibrator circuit 114, the delay circuit 116, and the No. 1 NAND gate 118. Inasmuch as this signal is not forthcoming from the second bistable multivibrator circuit 114, the No. 3 NAND gate 126 will not actuate the No. 13–18 power amplifier circuits 137–142, however.

Upon receipt of the next succeeding output pulse from the oscillator 110, however, the first bistable multivibrator circuit 112 will change state and will thereby initiate an output signal $B_o$ to the delay circuit 116, the second bistable multivibrator circuit 114, and the No. 1 NAND gate 118, the output of which now goes to zero to disable the No. 2 and 3 NAND gates 124 and 126. The second bistable multivibrator circuit 114 will continue to generate the output signal $B_1$, however, although both the No. 2 and No. 3 NAND gates 124 and 126 are inactivated.

Generation of the alternative output signal $B_o$ by the first bistable multivibrator circuit 112 does not change the conducting condition of the second bistable multivibrator circuit 114, but it prepares this assembly to respond to the next succeeding output signal $\bar{B}_o$ from the first bistable multivibrator circuit 112. Accordingly, when the third or next succeeding output pulse from the oscillator 110 is applied to the input side of the first bistable multivibrator circuit 112, the first bistable multivibrator circuit 112 will again provide its initial output signal $\bar{B}_o$ to the second input of the multivibrator 114, and will again remove its output signal $B_o$ from the delay circuit 116, from the input side of the second bistable multivibrator circuit 114, and from the No. 1 NAND gate 118. This will now cause the second bistable multivibrator circuit 114 to change condition, and to discontinue its output signal $B_1$ to the No. 2 NAND gate 124. Accordingly, the second multivibrator 114 will then begin generating the alternative actuating signal $B_1$ to the input side of the No. 3 NAND gate 126. The No. 1 NAND gate 118 is again generating an output signal to the input side of the No. 3 NAND gate 126, as well as to the input side of the No. 2 NAND gate 124. However, the output of the delay circuit 116 has again gone from one to zero (binary), thereby disabling or inactivating the No. 3 NAND gate 126 until the signal returns to binary one. When this occurs, however, the No. 3 NAND gate 126 will respond by actuating the No. 13–18 power amplifier circuits 137–142.

The circuitry in FIG. 4 has heretofore been described in the manner with which it operates when the mode switch 122 is positioned to connect the reference voltage 120 to the input of the No. 1 NAND gate 118. In other words, the circuitry has been discussed when it is functioning in a time domain manner or mode. However, if the mode switch 122 is positioned to couple the input side of the No. 1 NAND gate 118 to ground, the circuitry will operate instead in a frequency domain manner. Accordingly, as long as the output from the No. 1 NAND gate 118 is one (binary), it will have no effect upon the operation of either the No. 2 or No. 3 NAND gates 124 and 126. If the output signal from the No. 1 NAND gate 118 goes to zero, however, it will effectively inhibit or disable the No. 2 and No. 3 NAND gates 124 and 126. It will thus be seen that when the mode switch 122 is positioned to couple the No. 1 NAND gate 118 to ground, the output of the No. 1 NAND gate 118 will always be one. Accordingly, the No. 1 NAND gate 118 will have no effect at any time upon the operation of the No. 2 and No. 3 NAND gates 124 and 126 any time the mode switch 122 is positioned at ground, and the circuitry will then operate to produce a frequency domain output signal at probes 5 and 7. In other words, the power amplifiers 130–142 in the circuit will operate strictly according to the operation of the second bistable multivibrator 114. On the other hand, if the mode switch 122 is moved to couple the reference voltage source 120 to the No. 1 NAND gate 118, the output of the No. 1 NAND gate 118 will go to zero whenever the first bistable multivibrator 112 generates the output signal $B_0$. Therefore, the No. 2 and No. 3 NAND gates 124 and 126 will be disabled or inactivated one-half of the time the transmitter circuit depicted in FIG. 2 is operating.

The circuitry and operation of each of the three line control circuits 32–36 depicted in FIG. 2 may be identical in all respects. The only difference between the operation of the No. 1 line control circuit 32, and the No. 2 and No. 3 line control circuits 34–36 for example, is the effect provided by the difference in phase of the output signals being generated by the generator 30 in the three conductors 30A–C.

Figure 5:
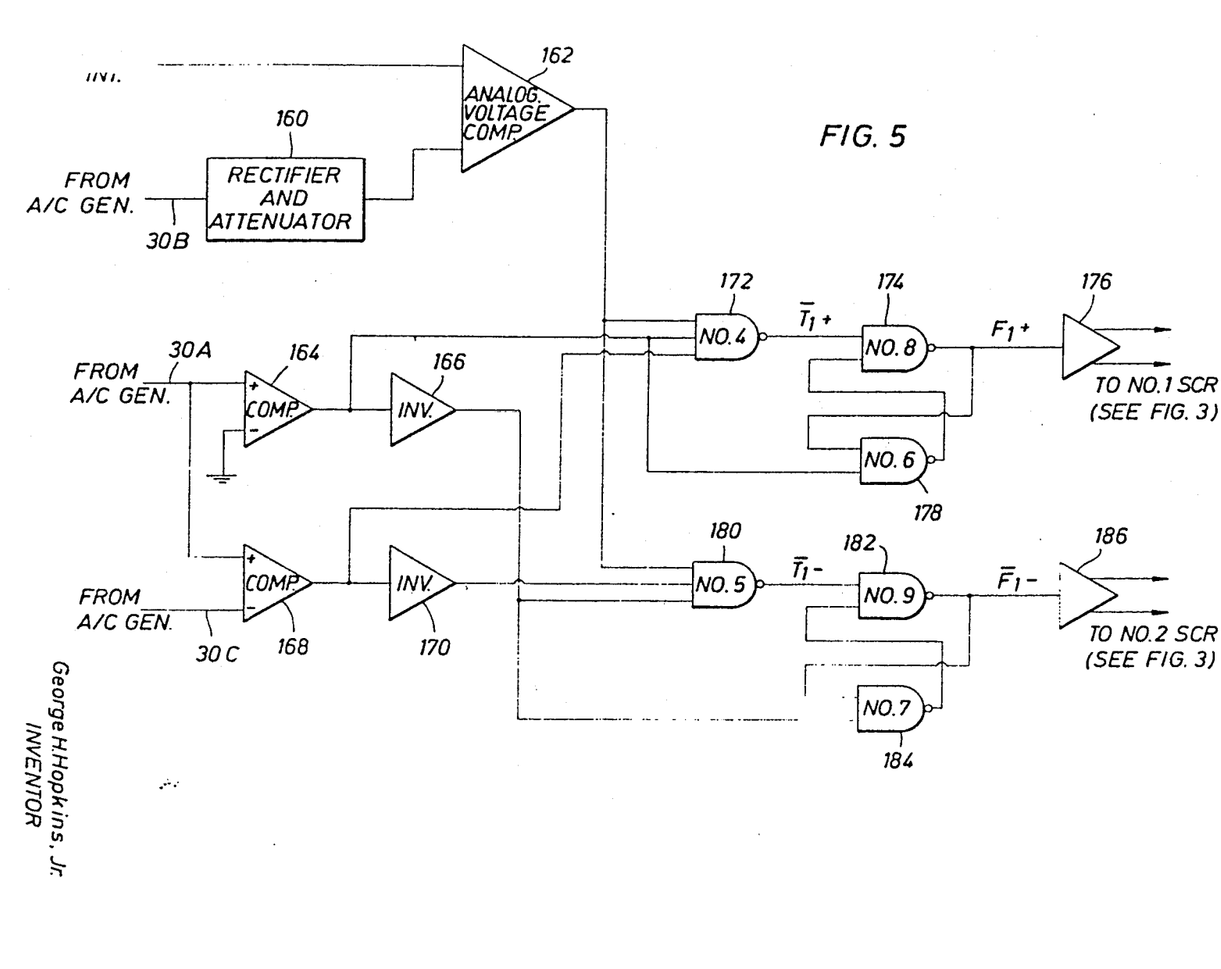
FIG. 5 is a more detailed schematic representation of a further different portion of the apparatus depicted in FIG. 2.

Referring now to FIG. 5, there may be seen a schematic representation of the No. 1 line control circuit 32 which may be taken as equally representative of the internal details and operation of the No. 2 and No. 3 line control circuits 34 and 36. In particular, there may be an active full-active rectifier and attenuator 160 connected to conductor 30B leading to the AC generator 30 in FIG. 2, and having its output connected to one of the two input terminals of an analog voltage comparator 162. The other input terminal of the comparator 162 may be seen to be connected to the output of the integrator 50 which is depicted in FIG. 2. Another analog voltage comparator 164 may be seen to have one of its two inputs connected to ground and the other suitably connected to conductor 30A leading to the generator 30, as well as to one of the inputs of a third analog voltage comparator 168. This third analog voltage comparator 168 has its other input connected to the third conductor 30C leading to the AC generator 30.

The output of the first analog voltage comparator 162 may suitably be connected to one of the three inputs of a No. 4 NAND gate 172 of the type described in the aforementioned book by Millman and Taub, and is also coupled to one of the three inputs of a No. 5 NAND gate 180. The output of the second analog voltage comparator 164 may be seen to be connected to the input side of a simple inverter 166, and also to the second input terminal of the No. 4 NAND gate 172 and to one of the inputs of a No. 6 NAND gate 178. The output of the third analog voltage comparator 168 is connected to the input of another simple inverter 170, and also to the third input of the No. 4 NAND gate 172. The output of the first inverter 166 is connected to one of the inputs of the No. 5 NAND gate 180 and to one of the three inputs of a No. 7 NAND gate 184. The output of the second inverter 170 is, in turn, connected to the remaining input of the No. 5 NAND gate 180.

The output of the No. 4 NAND gate 172 may suitably be connected to one of the two inputs of a No. 8 NAND gate 174, and the output of the No. 5 NAND gate 180 may be connected to one of the inputs of a No. 9 NAND gate 182. The other input of the No. 8 NAND gate 174 may be connected to the output of the No. 6 NAND gate 178, whereas the output of the No. 8 NAND gate 174 is connected to the opposing input of the No. 6 NAND gate 178, as well as to the input side of a first power amplifier 176 of conventional design. The output of the No. 7 NAND gate 184 is connected to one of the inputs of the No. 9 NAND gate 182, and the output of the No. 9 NAND gate 182 may be connected to the opposing input of the No. 7 NAND gate 184 and to the input of a second power amplifier 186 of conventional design.

The first power amplifier 176 functions to provide a suitable gating or firing signal to the appropriate SCR in the primary SCR circuit 24 depicted in FIG. 2. For example, the output side of the power amplifier 176 will provide the firing signals which are applied to the No. 1 SCR 54 in the first SCR stage 53 depicted in FIG. 3. Alternatively, the output of the second power amplifier 186 will provide the firing signals which control the No. 2 SCR 55 in the first SCR stage 53.

The purpose of the No. 1 line control circuit 32 depicted in FIG. 5 is to establish a "window" during which suitable output or firing signals may be generated, and also to establish this "window" at certain preselected time intervals during the operation of the transmitter system depicted in FIG. 2. It is a function of the second analog-to-voltage comparator 164 to determine whether the input from conductor 30A leading to the generator 30 is either positive or negative, and this may be seen to determine which of the two SCRs 54 and 55 can be rendered conductive at a given time. It is a function of the third analog-to-voltage comparator 168 to establish the occurrence of the "window" and the output of the second analog voltage comparator 164 determines or establishes the termination of the "window". In this respect, the length of the "window" is actually determined by the frequency of the output signal provided by the generator 30.

When the input signal to the second analog-to-voltage comparator 164 enters the positive cycle, this produces an output from the comparator 164 which is applied to the inverter 166 and to the No. 4 NAND gate 172. This same signal from the generator 30 will also be applied to the third analog-to-voltage comparator 168, as hereinbefore explained. However, when the voltage being supplied by the generator 30 by way of conductor 30C to the other input of the third analog-to-voltage comparator 168 becomes less than the input voltage in conductor 30A, from the generator 30 to the second analog-to-voltage comparator 164, the output of the comparator 168 rises to initiate the "window". It is a well known property of a three-phase circuit that the two different outputs from the generator 30 which are applied, respectively, to the second and third analog-to-voltage comparators 164 and 168, will cross at a phase angle of 30° with respect to the generator voltage being supplied to the second comparator 164. (It is assumed in this case that the phase sequence from the generator 30 is such that conductors 30A, 30B, and 30C are rendered positive in that order.

If the first analog voltage comparator 162 generates a firing signal during the occurrence of the foregoing "window", and if the input signal from the generator 30 to the second analog voltage comparator 164 is positive with respect to ground, the output of the No. 4 NAND gate 172 will change state and go to zero to actuate the No. 8 NAND gate 174, and to also produce an output signal to activate the first power amplifier 176. It will be noted in this respect that the combination of No. 8 and 6 NAND gates 174 and 178 constitute a latching circuit for the purpose of holding the output of the No. 8 NAND gate 174 coupled to the input side of the first power amplifier 176 until the generator voltage in conductor 30A leading to the second analog voltage comparator 164 changes from positive to negative. When this occurs, however, it effectively changes the operating state of the No. 8 NAND gate 174, and this effectively "unlatches" the output signal of the No. 8 NAND gate 174 from the input side of the first power amplifier 176. It will be apparent, of course, that the No. 5, No. 9, and No. 7 NAND gates 180, 182, and 184, operate in exactly the same manner to drive the second power amplifier 186. However, these components operate in response to a change in the input power to the second analog voltage amplifier 164 from positive to negative, instead of from negative to positive.

It should be noted that the moment at which the various SCR components in the primary SCR circuit 24 are fired, is determined by the instant at which the output from the rectifier and attenuator circuits 160 becomes less than the output signal from the integrator 50. At this point, the first analog-to-voltage comparator 162 responds to generate an actuating signal to the No. 4 and No. 5 NAND gates 172 and 180, for the purpose of initiating the cycle hereinbefore described.

Referring again to FIG. 2, it will be apparent from the foregoing that an important feature of the present invention is the provision and use of the integrator 50 and analog voltage comparator 46 to establish and digitally regulate the firing operation with much greater precision than is possible with a conventional analog-type feedback system or circuit. As previously explained, the purpose of the comparator 46 is to provide an indication of whether the transmitter output current is either greater or less than the level sought to be provided, but this indication does not provide a measurement of the extent of the error.

The integrator 50 operates in response to an output from the comparator 46 to either increase or decrease the current being supplied to the transmitter electrodes 4 and 6 until the current is overdriven. Thus, the integrator 50 will cause the current being supplied to the probes 4 and 6 to "hunt" whenever a correction is required. However, with a digital type of operation and with properly selected integrator values, the range of this hunting is extremely small compared with the amplitude of the transmitter output current being applied to the probes 4 and 6. Furthermore, when this "hunting" is performed in conjunction with the digital-type output of the comparator 46, the result is an output which is much more stable than that which can be obtained with a conventional and wholly-analog system.

It is another feature of the present invention to employ the time dependent voltage from the generator 30 to the rectifier and attenuator circuit 160, in conjunction with the output of the integrator 50, to determine the instant at which each SCR in the primary SCR circuit 24 is fired. This causes or permits the conduction angle of the SCR to be completely independent of the frequency of the output of the generator 30 and thereby renders the amplitude of the transmitter output signal substantially independent of fluctuations in the frequency of the signal from the generator 30. Furthermore, the firing angle of each SCR will automatically adjust in response to amplitude fluctuations in the output signal from the generator 30, to provide compensation for such fluctuations, and to maintain the output current to the transmitter probes 4 and 6 at the preselected level. Additionally, this tends to linearize the voltage of the signal applied to the probes 4 and 6 with respect to the output voltage being generated by the integrator 50.

Referring again to FIG. 1, it will be noted that the system illustrated therein is commonly referred to as a dipole-dipole electrode array, as hereinbefore stated. The circuitry depicted in FIGS. 3–5 is particularly useful in an induced polarization system employing a dipole-dipole arrangement of probes. However, the operation and usefulness of the circuitry depicted in FIGS. 2–5 is not limited to a dipole-dipole arrangement of probes, and is equally applicable to other conventional arrays such as the well known "pole-dipole" arrangement, or to the so-called "Schlumberger" arrangement wherein the receiver probes are both positioned intermediately of a pair of widely spaced-apart transmitter probes, and wherein the zone of investigation is measured from one transmitter probe to the point which is exactly one-half the distance between the transmitter probes and exactly one-half the distance between the two receiver probes.

Although the foregoing discussion of the present invention has emphasized its suitability for surface prospecting for the purpose of locating and determining the size and configuration of ore bodies, the methods and apparatus of the invention are equally suitable for all forms and aspects of geological investigation. In particular, the present invention is especially suitable for investigating the character of subsurface earth formations traversed by a borehole, such investigation being more commonly referred to by the term "well logging".

In such an application of the invention, the transmitter 2 and receiver 8 indicated in FIG. 1 will preferably be enclosed in an elongated instrument housing of conventional design which may be suspended in the borehole from a conventional well logging cable. Instead of probes of the type which are embedded in the surface of the earth, the electrodes 4–6, and 10–12 will conveniently be mounted on friction pads and urged against the borehole wall by spring-loaded bowsprings or arms. Surface recording equipment will be coupled to the upper or opposite end of the cable for providing a depth-correlated record of the measurement taken by the receiver 8 and electrodes 10 and 12, and this measurement may be graphically displayed on a conventional strip chart or the like.

Since the logging cable may include a grounded sheath and a plurality of leads or conductors, part or all of both the transmitter 2 and the receiver 8 may be located at the surface, and the transmitter signal may (for example) be supplied to the electrodes in the borehole by way of one or more conductors in the logging cable. Alternatively, the line controls 32–36, converter 22, and the feedback components depicted in FIG. 2 may be located in the elongated instrument housing, and the generator 30 may be located at the surface. Other alternative arrangements may be found suitable for well logging purposes, wherein the ultimate purpose of the investigation is to find and identify subsurface earth formations containing valuable fluids such as oil and gas. Such apparatus may, of course, be quite useful for logging test boreholes which are drilled to locate ore bodies or deposits of substances such as iron or copper ore.

Although the transmitter referred to in FIGS. 2–5 has only been discussed and depicted with respect to a three-phase power supply, it should be realized that this is not a critical feature of the invention, and that other conventional sources of power may be used. For example, the control technique disclosed herein is equally useful in a single-phase transmitter circuit wherein appropriate synthesis of the voltages in conductors 30B and 30C is provided.

Various other modifications and refinements may be made in the methods and apparatus hereinbefore described, and in the structures illustrated in the accompanying drawings. Accordingly, the methods and apparatus specifically described and depicted herein are intended to be exemplary only, and are not intended as limitations on the essential concept of the present invention.

What is claimed is:

1. An improved transmitter for an induced polarization system for performing subsurface earth investigations or the like, comprising
   a power supply for generating an AC power signal,
   conversion means responsive to said power signal for deriving a transmitter output signal having a preselected waveform and amplitude which is independent of any load on said transmitter, transducer means responsive to the magnitude of the current of said transmitter output signal for providing a functionally related voltage, a comparator for deriving a comparison signal which is functionally related to said voltage from said transducer means and a reference voltage, integrating means responsive to said comparison signal for deriving a functionally related adjustment signal, and line control means responsive to said power supply and said adjustment signal for deriving and applying phase-dependent actuating signals to said conversion means.

2. The transmitter described in claim 1, wherein said conversion means is a polyphase cycloconverter comprising a primary thyristor circuit responsive to said power supply and said actuating signals from line control means, a secondary thyristor circuit responsive to said primary thyristor circuit for generating said transmitter output signal as a phase-dependent function of said power supply and said actuating signals from line control means, and a step-up transformer coupling said primary thyristor circuit to said secondary thyristor circuit.

3. The transmitter described in claim 2, wherein said cycloconverter and generator are interconnected by three separate conductors and wherein said primary thyristor circuit includes a first SCR stage having a first pair of oppositely arranged SCR units interconnected to one of said three separate conductors, a second SCR stage having a second pair of oppositely arranged SCR units interconnected to another of said three separate conductors, and a third SCR stage having a third pair of oppositely arranged SCR units interconnected to a further different one of said three separate conductors.

4. The transmitter described in claim 3, wherein said line control means includes a first line control circuit actuated by said integrating means for providing firing signals to said first pair of SCR units in said first SCR stage, a second line control circuit actuated by said integrating means for providing firing signals to said second pair of SCR units in said second SCR stage, and a third line control circuit actuated by said integrating means for providing firing signals to said third pair of SCR units in said third SCR stage.

5. The transmitter described in claim 4, wherein each of said line control circuits includes a first line voltage comparator means interconnected with said integrator means and one of said three separate conductors for deriving a first gating signal, a second line voltage comparator means interconnected with another of said three separate conductors and a reference voltage for deriving a second gating signal, a third line voltage comparator means interconnected with said another conductor connected to said second line voltage comparator means and a further different one of said three separate conductors for deriving a third gating signal, first line gating means responsive to said first, second and third gating signals for deriving and applying firing signals of a first time-dependency to one of said SCR stages of said primary SCR circuit, and second line gating means responsive to said first, second and third gating signals for deriving and applying firing signals of a second time-dependency to said one SCR stage of said primary SCR circuit.

6. The transmitter described in claim 5, wherein each of said line control circuits further includes a rectifier and attenuator circuit interconnected between said first line voltage comparator means and said one of said three separate conductors, a first inverter means coupled to said second line voltage comparator means for inverting said second gating signal applied to said first and second line gating means, and a second inverter means coupled to said third line voltage comparator means for inverting said third gating signal applied to said first and second line gating means.

7. The transmitter described in claim 6, wherein said first and second line gating means in each of said line control circuits comprise a first NAND gate having a first input coupled to said first gating signal, a second input coupled between said second line voltage comparator means and said first inverter means, and third input coupled between said third line voltage comparator means and said second inverter means, a second NAND gate having a first input coupled to said first gating signal, a second input coupled to the output of said first inverter means, and a third input coupled to the output of said second inverter means, a first power amplifier for generating a firing signal of a first phase dependency, a second power amplifier for generating a firing signal of a second phase dependency, a third NAND gate having one of a pair of inputs coupled to the output of said first NAND gate and having its output coupled to said first power amplifier, a fourth NAND gate having its output coupled to the other input of said third NAND gate and having one of a pair of inputs coupled to the output of said third NAND gate and its other input connected between said second line voltage comparator and said first inverter, a fifth NAND gate having one of a pair of inputs connected to the output of said second NAND gate and its output coupled to said second power amplifier, and a sixth NAND gate having its output coupled to the other input of said fifth NAND gate and having one of a pair of inputs coupled to the output of said fifth NAND gate and its other input connected to the output of said first inverter means.

8. The transmitter described in claim 7, wherein said first and second power amplifiers in each of said line control circuits are connected to different ones of said SCR stages in said primary SCR circuit to actuate selected ones of said SCR units therein.

9. The transmitter described in claim 3, including polarity control means coupled to said secondary SCR circuit of said polyphase cycloconverter for determining the polarity of said transmitter output signal.

10. The transmitter described in claim 9, wherein said polarity control means includes a supply of actuating pulses, a first bistable multivibrator responsive to said supply of actuating pulses and having a pair of outputs, a second bistable multivibrator having a pair of inputs coupled to corresponding ones of said pair of outputs of said first bistable multivibrator and also having a pair of outputs, a first plurality of power amplifiers having outputs coupled to said secondary SCR circuits, a second plurality of power amplifiers having outputs coupled to said secondary SCR circuit, and mode and gating circuitry responsive to said first and second bistable multivibrators for selecting and actuating said first and second pluralities of power amplifiers.

11. The transmitter described in claim 10, wherein said mode and gating circuitry in said polarity control means further includes a first NAND gate having one of a pair of inputs connected to a source of reference voltage and the other input coupled to one of said pair of outputs of said first bistable multivibrator, a second NAND gate having its output coupled to said first plurality of power amplifiers and having one of three inputs coupled to the output of said first NAND gate and another of said three inputs coupled to one of said pair of outputs of said second bistable multivibrator, and a third NAND gate having its output coupled to said second plurality of power amplifiers and having one of three inputs coupled to the output of said first NAND gate and another of said three inputs coupled to the other of said pair of outputs of said second bistable multivibrator, and inhibiting means for applying an inhibiting signal to a further one of said three inputs of each of said second and third NAND gates during a preselected limited time interval.

12. The transmitter described in claim 11, wherein said inhibiting means comprises
a monostable multivibrator having its input coupled to one of the outputs of said first bistable multivibrator and having its output coupled to said further one of said three inputs of each of said second and third NAND gates.

13. The transmitter described in claim 12, wherein said mode and gating circuitry in said polarity control means further includes
mode programming means adapted when in one of two preselected conditions to program said secondary SCR circuit to provide a time domain transmitter output signal and when in the other of said two preselected conditions to program said secondary SCR circuit to provide a frequency domain transmitter output signal.

14. The transmitter described in claim 13, wherein said mode programming means further includes
another different reference voltage source,
switch means for selecting and coupling one of said reference voltage sources to said one of said pair of inputs of said first NAND gate.

15. The transmitter described in claim 3, wherein said secondary SCR circuit of said polyphase cycloconverter further includes
a first full-wave polyphase bridge rectifier circuit, and
a second full-wave polyphase bridge rectifier circuit connected in inverse parallel with respect to said first full-wave polyphase bridge rectifier circuit.

16. The transmitter described in claim 15, further including polarity control means interconnected to actuate said first and second full-wave polyphase bridge rectifier circuits to receive and conduct signals from said primary SCR circuit.

17. The transmitter described in claim 16, wherein said first full-wave polyphase bridge rectifier is composed of a first plurality of SCR units responsive to said polarity control means for receiving and conducting signals from said primary SCR circuit, and
wherein said second full-wave polyphase bridge rectifier circuit is composed of a second plurality of SCR units responsive to said polarity control means for receiving and conducting signals from said primary SCR circuit.

18. The transmitter described in claim 17, wherein said polarity control includes
a first plurality of power amplifiers coupled to said first plurality of SCR units,
a second plurality of power amplifiers coupled to said second plurality of SCR units, and
gating and mode programming means for selectively actuating said power amplifiers to cause said SCR units to provide a transmitter output signal of preselected amplitude and wave form.

19. An improved transmitter for an induced polarization system for performing subsurface earth investigations or the like, comprising
a power supply for generating an AC power signal,
conversion means responsive to said power signal for deriving a transmitter output signal,
monitoring means responsive to said transmitter output signal for producing a control signal having a waveform functionally related at all instances of time to predetermined time dependent instantaneous amplitude characteristics and
line control means responsive to said control signal and to said AC power signal for deriving and applying phase-dependent actuating signals to said conversion means for regulating the waveform of said transmitter output signal according to said predetermined characteristics.

20. The apparatus described in claim 19, wherein said conversion means generates said transmitter output signal as a function of said phase-dependent actuating signals derived by said line control means and said control signal produced by said monitoring means.

21. The apparatus described in claim 20, wherein said monitoring means further comprises
transducer means responsive to said transmitter output signal for providing a functionally related transducer voltage, and
a comparator means for deriving a comparison signal which is a function of said voltage from said transducer means and a reference voltage.

22. The apparatus described in claim 21, wherein said transducer means provides said transducer voltage as a function of the magnitude of the current of said transmitter output signal.

23. The apparatus described in claim 22, wherein said monitoring means further comprises
integrating means for actuating said line control means as a function of said comparison signal.

* * * * *